Figure 1:
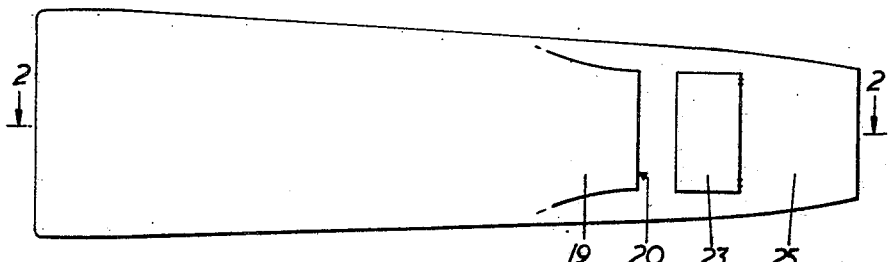

Dec. 18, 1962   A. H. FLETCHER   3,068,646
IMPROVEMENTS IN BY-PASS TYPE GAS TURBINE ENGINES
Filed Jan. 5, 1960   3 Sheets-Sheet 1

Inventor
ARTHUR HOLMES FLETCHER

By
Cushman, Darby & Cushman
Attorneys

Dec. 18, 1962  A. H. FLETCHER  3,068,646
IMPROVEMENTS IN BY-PASS TYPE GAS TURBINE ENGINES
Filed Jan. 5, 1960  3 Sheets-Sheet 2
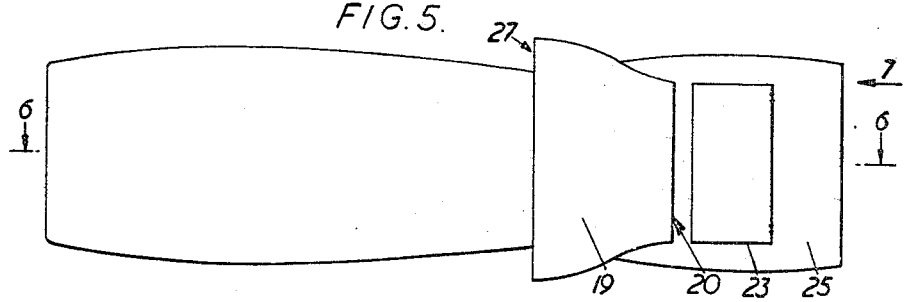
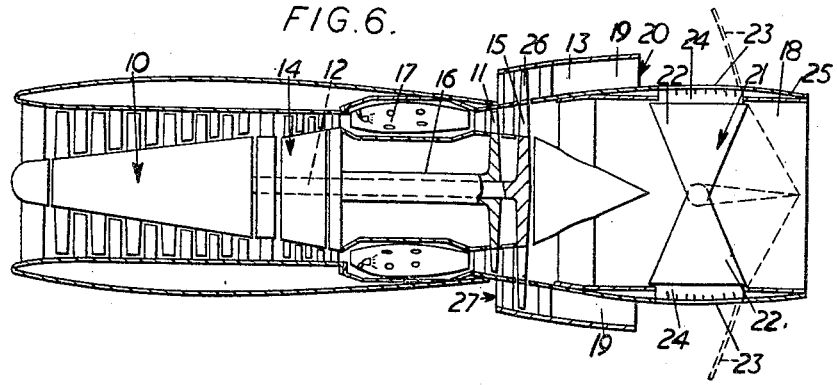
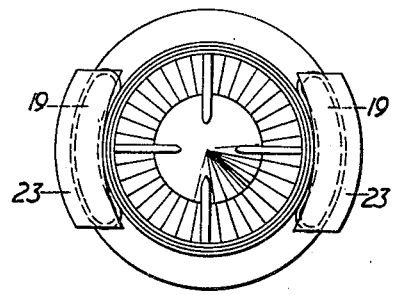
Inventor
ARTHUR HOLMES FLETCHER
By
Cushman, Darby & Cushman
Attorneys

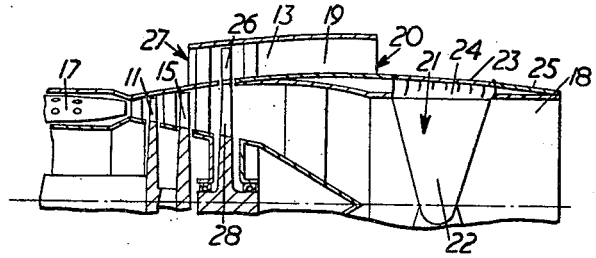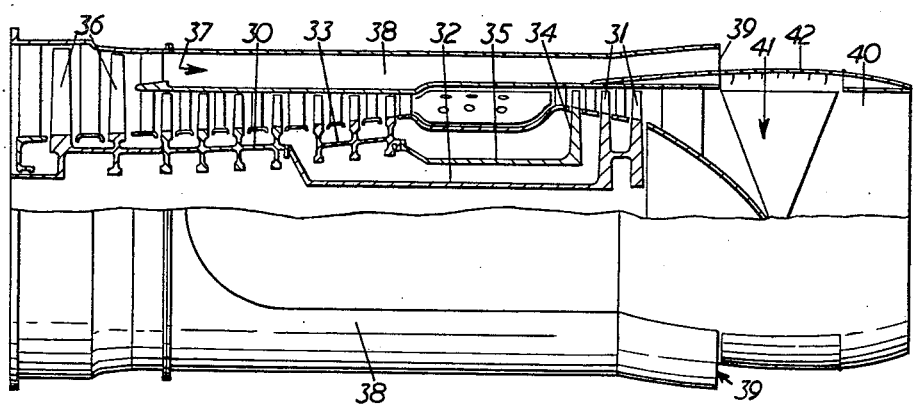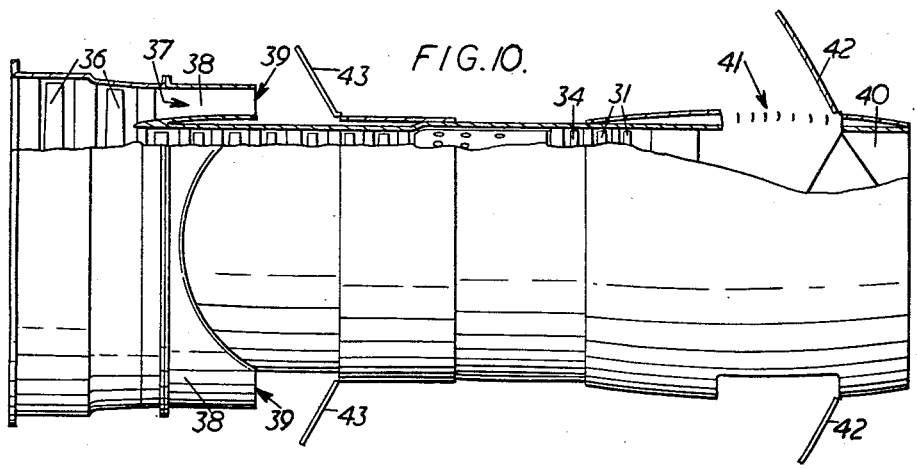

United States Patent Office 3,068,646
Patented Dec. 18, 1962

3,068,646
IMPROVEMENTS IN BY-PASS TYPE GAS TURBINE ENGINES
Arthur Holmes Fletcher, Littleover, Derby, England, assignor to Rolls-Royce Limited, Derby, England, a corporation of Great Britain
Filed Jan. 5, 1960, Ser. No. 626
Claims priority, application Great Britain Jan. 28, 1959
9 Claims. (Cl. 60—35.6)

This invention relates to gas turbine engines of the by-pass type, that is, of the type in which an additional passage is provided externally of the engine for flow of by-pass air. The by-pass air may be caused to flow by a fan, or by the early stages of a compressor, or by the latter stages of a compressor.

The fan, if used, may be driven by or attached to a compressor or a turbine. The term by-pass engine is intended to include the type of engine more conventionally called a ducted fan engine, and also to include the type of engine known as an aft fan engine. The by-pass air may be derived from any source, the source being immaterial.

An object of the invention is to provide a thrust reverser arrangement which can be applied to a by-pass engine without substantial decrease of the ground clearance of the engine when the thrust reverser is in the operative position, the thrust reverser arrangement being adapted, or connected with means, to reverse the by-pass air flow.

According to the present invention the by-pass passage is divided into two separate ducts which are situated along the sides of the engines and flap means interconnected with engine thrust reverser means are situated on the sides of the engine down-stream of the open ends of the by-pass duct portions and adapted when the engine thrust reverser means are operative to move to position in which they cause the flow of by-pass air to be reversed.

Preferably the flap means when in their closed inoperative position form a smooth continuation of the outer surface of the engine fairing structure.

In one arrangement the flap means form part of the thrust reverser means associated with the jet pipe of the main portion of the engine.

The invention is particularly applicable to a by-pass engine in which the by-pass ratio of the engine is high, resulting in a large diameter by-pass passage and a large flow of by-pass air through the passage.

In some cases the by-pass ratio may be unity.

In a preferred arrangement the thrust reverser means is of the type described in British Patent No. 745,649 (Rolls-Royce Limited).

By dividing the by-pass passage into two ducts and running them along the sides of the engine, the ground clearance is virtually unaffected, and the flap means for reversing the flow of by-pass air also leave the ground clearance unaffected.

Figure 2:
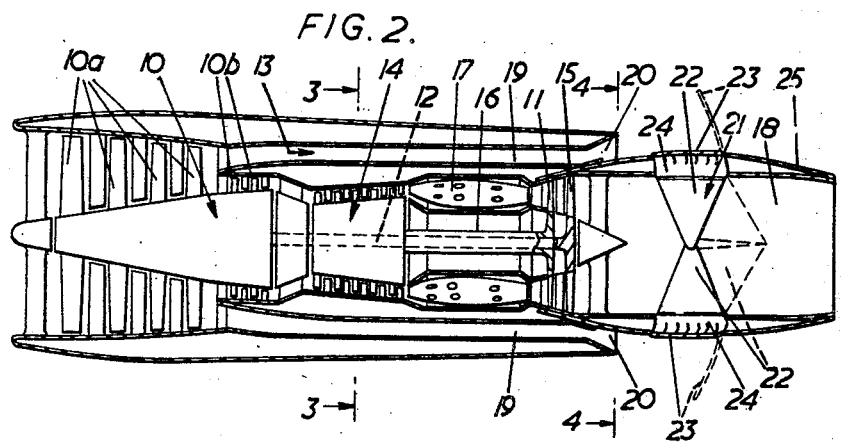
Figure 3:
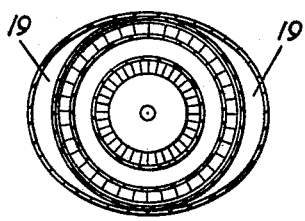
Figure 4:
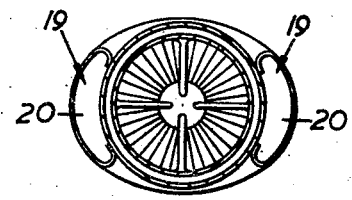

Some embodiments of the present invention will now be described with reference to the accompanying drawings in which:

FIGURE 1 a side elevation of an engine embodying the present invention in which the flow of by-pass air is derived from the early stages of a compressor, FIGURE 2 is a section on the line 2—2 indicated on FIGURE 1, FIGURE 3 is a section on the line 3—3 indicated on FIGURE 2, FIGURE 4 is a section on the line 4—4 indicated on FIGURE 2, FIGURE 5 is a side elevation of an engine embodying the invention in which the flow of by-pass air is derived from fan blades attached to a low pressure turbine of the engine, FIGURE 6 is a section on the line 6—6 indicated on FIGURE 5, FIGURE 7 is a view in the direction arrow 7 indicated on FIGURE 5, FIGURE 8 is a view similar to that shown in FIGURE 6 except that the fan blades are driven by a free turbine, FIGURE 9 is a plan view, partly in section, of an engine embodying the present invention in which the flow of by-pass air is derived from fan blades driven by a compressor of the engine; and FIGURE 10 is a view similar to that shown in FIGURE 9 except that the by-pass passage terminates just rear of the fan blades.

The engine shown in FIGURES 1 to 4 of the drawings consists of a multi-stage axial-flow low-pressure compressor 10 driven by a low pressure turbine 15 through shafting 12. The first four stages 10a of the compressor feed a by-pass duct 13 in addition to feeding the remaining stages 10b of the compressor. The engine also comprises a high pressure compressor 14 which is driven by a high pressure turbine 11 through shaft 16 and also combustion equipment 17 in which the compressed air delivered by the high pressure compressor 14 is burned with fuel, the products of combustion passing through the turbines 11 and 15 to drive them before exhausting to atmosphere through a jet pipe 18.

The by-pass duct 13 is divided into two duct portions 19 (FIGURES 3 and 4) which terminate in a pair of outlets 20.

The jet pipe 18 is provided with a thrust reverser unit 21 which comprises a pair of pivoted valve members 22 and a pair of flap members 23 which when in the solid line position shown in FIGURE 2 close off the outlet of ducts 24 which are provided with guide vanes. When in this position, the flap members form a smooth continuation of the outer surface of the engine fairing structure 25. When the thrust reverser 21 is in the operative position the valve members 22 will be moved to the position indicated by dotted lines in FIGURE 2 in which they prevent a flow of gases through the jet pipe 18, and the flap members 23 will be in the position shown in dotted linse in which the ducts 24 are open for the discharge of hot gases in a forwardly direction. The flap members 23 when in the open position act as deflector members for reversing the direction of flow of the by-pass air issuing from the outlets 20 of the duct portions 19.

It will be appreciated that the width (transversely of the engine) of the flap members 23 will be substantially the same as the width of the outlets 20 in order to obtain reversal of substantially the whole of the by-pass air.

Instead of feeding the by-pass duct 13 with air extracted from the compressor 10, the by-pass duct 13 may be supplied with air from an aft fan as shown in FIGURES 5 to 7. In describing these figures parts similar to those described with reference to FIGURES 1 to 4 will be indicated by the same reference numeral. In this embodiment, the blades of the low pressure turbine 15 carry fan blades 26. The fan blades 26 receive air from a forwardly facing intake 27 and deliver compressed air to the by-pass duct 13 which is divided into two portions 19 as described above. The flap members 23 when in the position indicated in dotted lines cause the air supplied by the fan blades 26 to be reversed in direction.

The arrangement shown in FIGURE 8 is similar to that described with reference to FIGURE 5 to 7 except that the fan blades 26 are carried by the blades of a free turbine 28 instead of being mounted on the low pressure turbine 15.

The engine illustrated in FIGURE 9 comprises a low pressure compressor 30 driven by a multi-stage low pressure turbine 31 through shafting 32 and a high pressure compressor 33 driven by a high pressure turbine 34 through shafting 35. The low pressure compressor 30 is also arranged to drive a pair of fan blades 36 which supply air to the inlet of the low pressure compressor 30 and also to a by-pass duct 37. The by-pass duct 37 is divided into two portions 38 which are located down the sides of the engine and which terminate in a pair of outlets 39. The hot gases from the engine pass to atmosphere through a jet pipe 40 which includes a thrust reverser unit 41 which is identical to the thrust reverser unit 21 described with reference to FIGURES 1 to 4. During operation of the reverser unit 41 flap members 42 are moved to a position in which they cause the compressed air issuing from the outlets 39 to be reversed in direction.

The engine illustrated in FIGURE 10 is identical to that described with reference to FIGURE 9 except that the duct portions 38 terminate just downstream of the fan rotor blades 36. In this arrangement the outlets 39 terminate too far upstream for the by-pass air to be reversed by the flap members 42 and, therefore, a pair of flap members 43 are provided just downstream of the outlets 39. The flap members 43 are arranged to be moved to the position in which they cause the by-pass air flow to be reversed simultaneously with movement of the flap members 42.

It will be appreciated that with a by-pass engine of high by-pass ratio the jet pipe 18, 40 can be smaller than in a non by-pass engine, thus the depth of the engine in a vertical plane at the rear of the engine can be kept comparatively small. The term by-pass ratio is defined as the ratio of the flow entering the by-pass duct 13, 37 to the flow entering the interior of the engine in a plane containing the entry of the by-pass duct.

The thrust reverser units 21, 41 may be of the type described in British Patent No. 745,649 (Rolls-Royce Limited). It will be appreciated that by splitting the by-pass duct into two portions and running the portions along the side of the engine the ground clearance is virtually unaffected, and the flap members when in the position in which they reverse the flow of by-pass air also leave the ground clearance unaffected. This is of particular importance when the engine is carried in a pod supported by a strut below the aircraft wing.

The invention also provides an arrangement in which the whole of the engine propulsive gases are reversed in direction to cause a braking effect on the aircraft in which the engine is installed.

What I claim is:

1. In an aircraft power plant, the improvement comprising: a gas turbine engine having a casing including a jet pipe for discharging exhaust gases; conduit means providing a by-pass flow of air longitudinally to the rear and along at least a portion of said gas turbine engine, said conduit means having an annular inlet portion at its front end surrounding said gas turbine engine and dividing into separate ducts extending along opposite sides of said engine rearwardly of the same, each of said ducts terminating in an outlet portion along the side of said engine forward of the discharge end of said jet pipe; engine thrust reverser means associated with said jet pipe rearwardly of the outlet portions of said ducts to cause a change in direction of flow of exhaust gases and a reversal of thrust from said engine; deflector means positioned downstream of the outlet portions of said ducts, said deflector means including flaps carried by the casing adjacent the engine thrust reverser means and movable from an inoperative position to an operative position for substantially reversing flow of by-pass air being discharged from said conduit means and for cooperating with said engine thrust reverser means to guide exhaust gases deflected by said engine thrust reverser means.

2. A power plant, as claimed in claim 1, wherein air flow entering the annular inlet portion of said conduit means and the air flow entering the interior of said engine define a by-pass ratio in an order of one.

3. An aircraft power plant, as claimed in claim 1, wherein said flap elements have a width substantially equal to the width of the outlet of said ducts and are streamlined with said engine casing when in an inoperative position.

4. In an aircraft power plant, the improvement comprising: a gas turbine engine including a casing having a jet pipe for discharging of exhaust gases, a low pressure compressor, a high pressure compressor, combustion equipment, and a low pressure turbine and high pressure turbine for respectively driving said compressors; conduit means for providing a by-pass flow of air longitudinally to the rear and along at least a portion of said gas turbine engine, said conduit means having an annular inlet portion at its front end surrounding said gas turbine engine and in open communication with a portion of the outlet of said low pressure compressor so as to receive air therefrom, said annular inlet portion dividing into separate ducts extending along opposite sides of said engine rearwardly of the same, each of said ducts terminating in an outlet along the side of said engine forward of the discharge end of said jet pipe; an engine thrust reverser means operatively associated with said jet pipe rearwardly of the outlets of said ducts to cause a change in direction of flow of exhaust gases and a reversal of thrust from said engine; deflector means positioned downstream of the outlets of said ducts, said deflector means including flaps carried by the casing adjacent the engine thrust reverser means and movable from an inoperative position to an operative position for substantially reversing flow of by-pass air being discharged from said conduit means and for cooperating with said engine thrust reverser means to guide exhaust gases deflected by said engine thrust reverser means.

5. In an aircraft power plant, the improvement comprising: a gas turbine engine including a casing having a jet pipe for discharging exhaust gases, a multistage axial flow low pressure compressor, a high pressure compressor, combustion equipment, and a low pressure turbine and high pressure turbine for respectively driving said compressors; conduit means for providing a by-pass flow of air longitudinally to the rear and along at least a portion of said gas turbine engine, said conduit means having an annular inlet portion at its front end surrounding said gas turbine engine and in open communication with forward stages of said multistage axial flow low pressure compressor so as to receive air therefrom, said annular inlet portion dividing into separate ducts extending along opposite sides of said engine rearwardly of the same, each of said ducts terminating in an outlet along the side of said engine forward of the discharge end of said jet pipe; an engine thrust reverser means operatively associated with said jet pipe rearwardly of the outlets of said ducts to cause a change in direction of flow of exhaust gases and a reversal of thrust from said engine; deflector means positioned downstream of the outlets of said ducts, said deflector means including flaps carried by the casing adjacent the engine thrust reverser means and movable from an inoperative position to an operative position for substantially reversing flow of by-pass air being discharged from said conduit means and for cooperating with said engine thrust reverser means to guide exhaust gases deflected by said engine thrust reverser means.

6. An aircraft power plant, as claimed in claim 5, including fan blades carried by said low pressure compressor, said fan blades supplying air to the inlet portion of said conduit means.

7. In an aircraft power plant, the improvement comprising: a gas turbine engine including a casing having a jet pipe for discharging exhaust gases, a low pressure compressor, a high pressure compressor, combustion equipment, and a low pressure turbine and high pressure turbine for respectively driving said compressors, conduit means for providing a by-pass flow of air longitudinally to the rear and along at least a portion of said gas turbine engine, said conduit means having an annular inlet portion at its front end surrounding said gas turbine engine, said annular inlet portion dividing into separate ducts extending along opposite sides of said engine rearwardly of the same, each of said ducts terminating in an outlet along the side of said engine forward of the discharge end of said jet pipe; fan blades cooperating with the inlet portion of said conduit means for supplying by-pass air thereto, an engine thrust reverser means operatively associated with said jet pipe rearwardly of the outlets of said ducts to cause a change in direction of flow of exhaust gases and reversal of thrust of said jet engine; deflector means positioned downstream of the outlets of said ducts, said deflector means including flaps carried by the casing adjacent the engine thrust reverser means and movable from an inoperative position to an operative position for substantially reversing flow of by-pass air being discharged from said conduit means and for cooperating with said engine thrust reverser means to guide exhaust gases deflected by said engine thrust reverser means.

8. An aircraft power plant of the character described in claim 7 wherein said fan blades are driven by one of said low and high pressure turbines.

9. An aircraft power plant of the character described in claim 7 including a freely rotatable turbine mounted downstream of at least one of said high and low pressure turbines, said fan blades being mounted on said freely rotatable turbine.

References Cited in the file of this patent

UNITED STATES PATENTS

| | | |
|---|---|---|
| 2,430,399 | Heppner | Nov. 4, 1947 |
| 2,505,660 | Baumann | Apr. 25, 1950 |
| 2,527,732 | Imbert | Oct. 31, 1950 |
| 2,637,164 | Robson et al. | May 5, 1953 |
| 2,658,334 | Marchant | Nov. 10, 1953 |
| 2,696,079 | Kappus | Dec. 7, 1954 |
| 2,738,147 | Leech | Mar. 13, 1956 |
| 2,781,634 | Moore | Feb. 19, 1957 |
| 2,803,943 | Rainbow | Aug. 27, 1957 |
| 2,873,576 | Lombard | Feb. 17, 1959 |
| 2,937,495 | Perry | May 24, 1960 |

FOREIGN PATENTS

| | | |
|---|---|---|
| 244,761 | Switzerland | June 2, 1947 |
| 1,114,647 | France | Dec. 19, 1955 |
| 745,720 | Great Britain | Feb. 29, 1956 |